United States Patent Office 3,264,064
Patented August 2, 1966

3,264,064
COMPOUNDS CONTAINING THE VANADIUM HEXACARBONYL GROUP AND PROCESS FOR PREPARING THE SAME
Giulio Natta, Milan, Raffaele Ercoli, Monza, and Fausto Calderazzo, Milan, Italy, assignors to Montecatini Società Generale per l'Industria Mineraria e Chimica, Milan, Italy
No Drawing. Filed Apr. 19, 1960, Ser. No. 23,147
Claims priority, application Italy, Apr. 23, 1959, 6,707/59
11 Claims. (Cl. 23—203)

The present invention relates to certain novel vanadium compounds containing the vanadium-hexacarbonyl group $[V(CO)_6]$. More particularly it relates to the compound vanadium hexacarbonyl, $V(CO)_6$, to vanadium hydrocarbonyl and to compounds containing the hexacarbonyl vanadate anion, $[V(CO)_6]^-$, in combination with a simple or complex cation, that is, to salts of vanadium hydrocarbonyl.

Prior to our invention, compounds in which a vanadium atom was bound coordinately with 6 molecules of carbon monoxide had not been known. Only carbonyls of transition metals having an atomic number equal to or higher than 24 were known in the prior art. This is understandable, because considerations with respect to the electronic configuration of a hypothetic vanadium hexacarbonyl $[V(CO)_6]_n$, gave rise to serious doubts as to the possibility of isolating a hexacarbonyl of vanadium or of any other metal having an atomic number less than 24.

Accordingly, it is an object of this invention to provide a method of producing the novel compounds vanadium hexacarbonyl, $V(CO)_6$ and vanadium hydrocarbonyl.

Another object is to provide a method of producing certain novel compounds made up of a simple or complex cation in combination with the hexacarbonyl vanadate anion, $[V(CO)_6]^-$, which can be called salts of vanadium hydrocarbonyl.

Additional objects will become apparent hereinafter.

We have found, surprisingly, that by carbonylation of certain vanadium compounds, it is possible to obtain salts in which vanadium is present in an anion, $[V(CO)_6]^-$, and from which, by suitable operations, it is possible to separate the electrically neutral compounds, vanadium hexacarbonyl and vanadium hydrocarbonyl.

In accordance with one aspect of our invention, we have found that carbonylation of vanadium in the form of simple or commonly available compounds can be carried out by reacting the vanadium compound either in solution or suspension in inert solvents, with carbon monoxide or mixtures of carbon monoxide with hydrogen, with the aid of reducing systems consisting of both (1) metals or derivatives thereof which have reducing properties, which are more electropositive than vanadium, and (2) organic amines.

The vanadium compounds which can be used in this process are numerous and include virtually any salt containing vanadium as a cation or as a constituent of a cation, in any oxidation state. Typical of such suitable vanadium compounds are halides of the formula $VX_n$ (where $n$ is 2, 3, 4 or 5 and X is Cl, Br or I); oxyhalides of the formula $XOX_n$ (where $n$ is 1, 2 or 3 and X is Cl, Br or I); other inorganic vanadium or vanadyl salts such as sulfides; vanadium or vanadyl salts of organic anions such as acetates, propionates, butyrates, ethylhexanoates, naphthenates, and the like; and vanadium complexes e.g., with β-diketones or with alcohols such as acetylacetonates or alkoxides, or complexes in which low-valency vanadium is bound to coordinated organic groups, such as cyclopentadienyl, benzene, α,α'-dipyridyl, and the like.

The reducing system is preferably of the metal-amine type and contains at least two components: (1) a highly electropositive metal (e.g. electronegativity lower than 1.6 on the Pauling scale) such as sodium, potassium, lithium, beryllium, magnesium, calcium, zinc, or aluminum, or preferably mixtures thereof or alloys of these metals with each other. The electropositive metal may be substituted, either in whole or in part, by the corresponding metal hydride or metal alkyl hydride; (2) an anhydrous nitrogen base, preferably a tertiary base such as pyridine, quinoline, their homologues, or aliphatic trialkylamines. In general, an amine having the general formula $NR_1R_2R_3$, where $R_1$, $R_2$, and $R_3$ may be the same or a different alkyl, cycloalkyl or aryl group, is suitable.

If the starting vanadium compound does not contain a halogen, then the presence of an activator containing a halogen is desirable. For this purpose we may use an elementary halogen e.g. iodine, a halide of the aforementioned reducing metals, or, in general, an inorganic or organic halide capable of transferring a halogen onto the reducing metal. Halides of metals within Groups IV–VIII of the Periodic Table, or alkyl, cycloalkyl or aryl halides are each suitable to this end. Of course, if the starting vanadium compound contains a halogen, the addition of an activator can be dispensed with.

As to the reaction medium, either an organic base the same or similar to that used in the reducing system, e.g. pyridine, or an inert diluent such as an aliphatic or aromatic hydrocarbon or, more particularly, an ether, preferably aliphatic, can be used.

The carbonylation may be carried out by the action of carbon monoxide or mixtures of carbon monoxide with either hydrogen or with an inert gas such as nitrogen or the like, at temperatures of from about 50° to 250° C., preferably from about 80°–150° C., under pressures in excess of 10 atmospheres, preferably in excess of 50 atmospheres, e.g. as much as 400 atmospheres. The reaction preferably is continued until the absorption of carbon monoxide stops.

The complex mixture obtained at the end of the reaction contains, in general, in addition to compounds containing the vanadium hexacarbonyl group (which behave as salts of vanadium hydrocarbonyl, in which hydrogen can be substituted by metals), also salts formed by the metals or metallic compounds used as reducing agents with the anion initially bound to the starting vanadium compound (in addition to the excess, if any, of reducing metal or metallic compound). After partial or complete evaporation and recovery of the solvent and/or of the nitrogen base used, preferably under reduced pressure, a residue is obtained which, in order to obtain the desired products, must be treated further in the absence of oxygen.

The residue contains vanadium hexacarbonyl compounds of ionic type. These can be separated by extraction with suitable solvents, e.g., amine bases, water and/or ether.

Aqueous solutions containing the $[V(CO)_6]^-$ anion may also be prepared directly by treating the original residue with aqueous alkaline hydroxide solutions and by subsequent filtration.

From the solutions containing the $[V(CO)_6]^-$ anion thus obtained, various compounds containing the anion, $[V(CO)_6]^-$, can be prepared, e.g. by precipitation with suitable cations or by ion exchange reactions or by extraction with suitable solvents, such as ethers.

The possible salts of the hexacarbonyl vanadate anion can be represented by the general formulae:

$$Me^+[V(CO)_6]^-$$

where Me⁺ is a positive monovalent cation such as Li⁺, Na⁺, K⁺, Rb⁺, Cs⁺, Ag⁺, Cu⁺, Tl⁺, Hg⁺, NH₄⁺, NR₄⁺ or the like, $$Me^{++}[V(CO)_6]_2^-$$

where Me⁺⁺ is a positive divalent cation such as Ca⁺⁺, Sr⁺⁺, Ba⁺⁺, Fe⁺⁺, Co⁺⁺, Ni⁺⁺, Cu⁺⁺, Hg⁺⁺, Zn⁺⁺, Pb⁺⁺, Cd⁺⁺, Cr⁺⁺, Mn⁺⁺, or the like.

Trivalent cations Me⁺⁺⁺ or tetravalent cations Me⁺⁺⁺⁺, having low oxidizing properties, can also yield salts which however are easily hydrolyzable.

In the above indicated general formulae the Me⁺ and Me⁺⁺ cations can easily be coordinated with molecules containing atoms with unpaired electrons, such as e.g. water, alcohols, ethers, ketones. Thus, for instance, one can easily obtain hexacarbonyl-vanadates of alkali or earth-alkali metals, coordinated with two or more molecules of alkyl or cyclic ethers, such as diethylether, di-isopropolyether, di-butylether, tetrahydrofuran, dioxane, etc. It is a characteristic of these vanadium compounds to be soluble in various organic solvents, such as ethers, esters, ketones, alcohols, and to be thus easily extractable from their aqueous solutions in a pure state. Of a particular interest, due to their easy preparation, are the salts of complex cations in which the cation is coordinated with nitrogen bases such as ammonia, aliphatic amines, pyridines, $\alpha,\alpha'$-dipyridyl, o-phenanthroline and aliphatic amines such as ethylenediamine. These cations can be represented by the general formula $$[Me(B)_n]^{+x}$$

where Me is a metal (such as Ni, Co or Fe), B is a nitrogen base containing one or more nitrogen atoms, $n$ is the number of nitrogen base molecules co-ordinated with the cation (generally 2, 4, 6) and X is the electrostatic valence of the complex cation (generally 2 or 3). To isolate vanadium hexacarbonyl, one can treat the residual mixtures obtained by evaporation of the crude product or the solutions obtained as indicated above or the aforementioned salts with non-oxidizing mineral or organic acids, up to pH values equal to or lower than 4.

In such conditions vanadium hydrocarbonyl is formed which easily loses hydrogen and is transformed into vanadium hexacarbonyl. It is also possible to obtain vanadium hexacarbonyl by controlled oxidation of the $[V(CO)_6]^-$ anion or of the hydrocarbonyl with stoichiometric amounts of oxidizing agents such as e.g. Fe⁺³, I₂ or gas containing oxygen at a low partial pressure.

The vanadium hexacarbonyl and/or hydrocarbonyl thus set free can be separated from the solutions by simply filtering the solid obtained which consists of a crude product containing vanadium hexacarbonyl, or by extraction with solvents such as ethyl ether or other aliphatic ethers, or volatile hydrocarbons, such as e.g., pentane or petroleum ether and subsequently removal of the solvent at low temperature.

From the mixture obtained by acidification of the crude, vanadium hexacarbonyl or the corresponding hydrocarbonyl, due to their volatility, can also be separated by entrainment in the vapor phase in an inert gas stream, such as nitrogen, carbon monoxide or hydrogen.

Vanadium hexacarbonyl can be purified by sublimation under reduced pressure (10–100 torrs) at a temperature comprised between 40 and 60° C.

Vanadium hexacarbonyl is a crystalline solid having a characteristic unpleasant odor; upon exposure to air it decomposes quickly sometimes burning spontaneously; when heated under nitrogen it decomposes without melting above 70° C.

An X-ray examination of simple crystals shows that vanadium hexacarbonyl crystallizes in the orthorhombic space group P*nma*. The lattice constants of the elementary cell are:

$a = 11.97 \pm 0.02$ A.
$b = 11.28 \pm 0.01$ A.
$c = 6.47 \pm 0.02$ A.

The cell contains 4 V(CO)₆ units.

Vanadium hexacarbonyl is highly volatile and this would indicate that it is at least prevailingly monomeric. However, by analogy with carbonyls of other metals, such as manganese and cobalt, having an odd atomic number, one would have to assume that there could also be a dimeric form [V(CO)₆]₂.

Vanadium hexacarbonyl is scarcely soluble in hydrocarbons and moderately soluble in alkyl ethers. Its solutions are in general unstable; the infrared examination of a n-heptane solution (concentration 0.2% cell thickness 0.5 mm.) reveals an intense band at 5.075μ corresponding to 1970 cm.⁻¹, characteristics for CO groups in metal carbonyls.

Vanadium hexacarbonyl reacts with many organic compounds such as amines, amides, nitriles, alcohols, ethers, aldehydes, ketones, acids, esters and in general with Lewis bases. By treatment with an excess of iodine in organic solvents, it sets free 6 mols CO per vanadium atom. From its solutions in organic solvents, by reaction of different types (e.g., dismutations or reductions) it can be transformed into carbonyl vanadate anions, e.g., $[V(CO)_6]^-$, which can subsist in solution or can be precipitated as salts of heavy cations. Reactions which lead to the formation of anions of this type include: the reduction with sodium amalgam for preparing aqueous solutions of sodium hexacarbonyl-vanadate, and the dismutation caused by aqueous alkali solutions or by other strong electron-donor agents as indicated above, in analogy with what is known from the chemistry of dicobalt octacarbonyl.

More particularly, the tendency of vanadium hexacarbonyl to form the corresponding hexacarbonyl vanadate anion is shown by the dismutation reaction occurring by simple treatment of an ether solution of the compound with aqueous Ni (o-phenanthroline)₃ chloride solution. In this case, in fact, about 50% of the V(CO)₆ used is transformed into the [V(CO)₆]⁻ anion, which is precipitated as Ni (phenanthroline)₃ [V(CO)₆]₂.

Vanadium hexacarbonyl and the compounds containing carbonyl vanadates have interesting possible uses as catalysts for various organic syntheses, such as carbonylation with CO and hydrogen or with compounds containing a mobile hydrogen, and the polymerization of unsaturated compounds.

Another interesting use of vanadium hexacarbonyl arises from its thermal lability; it can in fact be easily decomposed, with the formation of metallic vanadium, on porous supports, such as alumina, silica and kieselguhr, thus allowing the preparation of catalystic masses containing metallic vanadium.

In contact with surfaces (e.g. metal surfaces) at temperatures above 100° C., V(CO)₆ vapors deposit vanadium mirrors. Vanadium hexacarbonyl can thus be employed to prepare vanadium coatings or metal alloys containing vanadium on their surface. Another interesting use is in the production of very pure metallic vanadium.

The following examples will further illustrate our invention. All parts are by weight unless otherwise indicated. All operations were carried out under a nitrogen atmosphere.

EXAMPLE 1

Into a 500-cc. stainless steel autoclave the following substances are introduced:

| | Grams |
|---|---|
| Anhydrous $VCl_3$ | 15.7 |
| Mg powder | 7.5 |
| Zn powder | 20.0 |
| Pyridine | 220.0 |
| Iodine | 1.0 |

After removal of air and flushing with nitrogen, carbon monoxide is introduced into the autoclave until the pressure is built up to 150 atmospheres. The autoclave is then set in agitating motion and heated to from about 130–150° C. for 18 hours. During this time a progressive decrease of pressure from about 225 to 180 atmospheres is observed. After cooling, the gases are removed and the autoclave content is extracted (under a nitrogen atmosphere). The reducing metals still present are separated by decantation. Pyridine is recovered by evaporation under vacuum. The residue is suspended in ethyl alcohol and is treated in the cold with 200 cc. of 4 normal sulfuric acid. The ether extract is washed, dried over sodium sulfate, and then the ether is distilled off, first under ordinary pressure and then at room temperature under reduced pressure. The solid residue is sublimed at 60–70° C. under 20 mm. Hg.

8 g. of vanadium hexacarbonyl, $V(CO)_6$, in the form of a blue-green solid having a very disagreeable odor are thus obtained. Yield on the vanadium used: 36%.

Analysis: 0.117 g. of the $V(CO)_6$ compound are decomposed quantitatively with iodine in an apparatus suitable for gas-volumetric determination of the gas developed. 71.3 cc. of gas are obtained. By chromatographic examination this gas is found to consist of pure CO. (Theoretical CO for $V(CO)_6$: 72.1 cc.)

On the residue obtained from the above determination the vanadium content is determined:

V found: 23.41%,
V theoretical for $V(CO)_6$: 23.28.

Similar results are obtained, when starting from vanadium halides, such as $VCl_3$, if the addition of iodine is omitted. Also, the amount of zinc can be reduced, while increasing the amount of magnesium.

EXAMPLE 2

A mixture consisting of:

| | Grams |
|---|---|
| $VOCl_3$ | 23 |
| Zn | 20 |
| Mg | 10 |
| Pyridine | 300 |
| Iodine | 1 | is subjected to carbonylation in the same autoclave and under the same operative conditions as described in Example 1.

The mixture resulting from the carbonylation stage is evaporated to dryness and treated as described in Example 1. The acidified mixture is extracted very rapidly with three successive portions each of 200 cc. of ethyl ether. The ether extract is separated and immediately evaporated under reduced pressure. By sublimation of the residue 5 g. sublimed vanadium hexacarbonyl are obtained.

EXAMPLE 3

Into the same autoclave the following reactants are introduced:

| | Grams |
|---|---|
| V (acetylacetonate)$_3$ | 20.5 |
| Mg powder | 7.0 |
| Zn powder | 15.0 |
| Pyridine | 150.0 |
| Iodine | 1.0 |

The carbonylation reaction is carried out as in Example 1 by operating from about at 120–130° C. for 7 hours with an initial carbon monoxide pressure of about 190 atmospheres. Vanadium hexacarbonyl is separated in the same manner as described in Example 1. 4 g. $V(CO)_6$, corresponding to a yield of 31% based on the amount of vanadium used, are obtained.

From the thus isolated carbonyl, solid, moderately stable compounds can be obtained by dismutation and precipitation with suitable reactants. By reacting a solution of 1 g. of $V(CO)_6$ in very pure ether, in the absolute absence of oxygen, with nickel-o-phenanthroline chloride, a red-brown precipitate is obtained which, after filtration and vacuum drying, gives the following analytical results:

| | Found | Calculated for Ni (o-phenanthroline)$_3$ [V(CO)$_6$]$_2$, molecular weight 1037.31 |
|---|---|---|
| N, percent | 8.04 | 8.12 |
| CO, percent | 31.02 | 32.41 |
| Ni, percent | 5.60 | 5.66 |
| V | 9.53 | 9.83 |

This precipitate is moderately stable in air and decomposes without melting when heated above 175° C. in a nitrogen atmosphere.

EXAMPLE 4

This example illustrates an operating procedure for preparing solid solutions and salts containing the hexacarbonyl vanadate anion $[V(CO)_6]^-$ directly from the reaction mixture obtained by carbonylation of vanadium compounds. All the operations described are carried out under nitrogen.

The crude reaction mixture obtained by carbonylation of 62.9 g. $VCl_3$ in 1000 cc. pyridine carried out as described in Example 1, in a 2-liter autoclave, using as reducing agent a mixture of 25 g. magnesium and 2 g. zinc, is decanted and successively filtered in a nitrogen atmosphere.

A sample of the filtered pyridine solution is analyzed and the CO and vanadium contents determined.

There are found present in the solution 41,060 cc. of CO in a molar ratio of 5.72 with respect to vanadium.

The pyridine solution containing vanadium hexacarbonyl and zinc and magnesium chlorides is now treated with twice its volume of water; after filtration and washing of the insoluble part with water, the solution is distilled under reduced pressure at 25–40° C. until all the pyridine present has been removed.

In this way 1520 g. of a yellow aqueous solution containing 30,800 cc. CO (75% of originally present CO) as hexacarbonyl vanadate anion are obtained.

(a) 250 g. of the water solution, corresponding to 5,060 cc. of CO, are extracted three times with ether.

After removing ether, a yellow crystalline residue of magnesium hexacarbonyl vanadate is obtained which is crystallized from dioxane and dried under 1 mm. Hg.

In this way 10.7 g. of magnesium hexacarbonyl vanadate, crystallized with 6 molecules of dioxane, are obtained (corresponding to 89% of the CO present in the solution).

Analysis for $Mg(V(CO)_6)_2 \cdot 6$ dioxane (mol. wt. 990.94): Calculated—Mg, 2.45%; V, 10.27%; CO, 33.92. Found—Mg, 2.14%; V, 11.04%; CO, 33.60.

(b) 250 g. of the water solution are treated with 150 cc. of a 10% sodium hydroxide water solution.

After decantation and filtration of the magnesium hydroxide which is formed the filtrate is extracted several times with ether.

The ether extracts are evaporated and the residual sodium hexacarbonyl vanadate is crystallized from dibutyl ether.

17.0 g. of sodium hexacarbonyl vanadate, crystallized with 2 molecules of dibutyl ether, (corresponding to 90% of the CO present in the solution, and to 47% of the originally employed $VCl_3$) are obtained.

Analysis for $NaV(CO)_6 \cdot 2$ dibutyl ether (mol. wt. 502.45): Calculated—Na, 4.56%; V, 10.13%, CO, 33.5%. Found—Na, 4.95%; V, 10.45%; CO, 33.25%.

(c) Operating as described under (b) 250 g. of the water solution are treated with a 10% water solution of potassium hydroxide.

After treating the reaction product as described under (b), 17.5 g. of potassium hexacarbonyl vanadate, crystallized with 2 molecules of dibutyl ether, are obtained (corresponding to 90% of the CO present in the solution and to 47% of the employed $VCl_3$).

Analysis for $KV(CO)_6 \cdot 2$ dibutyl ether (mol. wt. 518.55): Calculated—K, 7.56%; V, 9.83%; CO, 32.45%. Found—K, 7.94%; V, 10.04%; CO, 32.02%.

(d) Operating as described under (b) and (c), 250 g. of the water solution are treated with a 10% lithium hydroxide water solution. 16.1 g. of lithium hexacarbonyl vanadate, crystallized with 2 molecules of dibutyl ether, are obtained (corresponding to 90% of the CO present in the solution and to 47% of the employed $VCl_4$).

Analysis for $LiV(CO)_6 \cdot 2$ dibutyl ether (mol. wt. 486.40): Calculated—Li, 1.42%; V, 10.47%; CO, 34.58%. Found—Li, 1.75%; V, 10.59%; CO, 34.02%.

EXAMPLE 5

250 g. of the yellow solution prepared as described in Example 4 (corresponding to 10.500 cc. CO) are treated with 157 cc. of a 0.5 N solution of ferric chloride.

The vanadium hexacarbonyl obtained as a precipitate is filtered, washed twice with water and dried on $P_2O_5$ in a nitrogen atmosphere.

By successive sublimation at 50° C. and 15 mm. Hg, 10.6 g. of sublimate vanadium hexacarbonyl are obtained (yield 62%).

EXAMPLE 6

This example covers the preparation of solutions containing the hexacarbonyl vanadate anion starting from vanadium hexacarbonyl.

By reaction at room temperature of vanadium hexacarbonyl with alcohols, ethers, acetones, amines and other compounds, which can be defined as Lewis bases, a dismutation reaction takes place according to the scheme

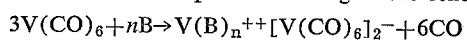

In the following table the results of a series of experiments carried out in a gas volumetric thermoregulated apparatus are reported:

*Table*

VANADIUM HEXACARBONYL DISMUTATION REACTIONS WITH VARIOUS LEWIS BASES AT 15° C.

| Lewis base | | $V(CO)_6$ employed, mols. $10^3$ | Duration, minutes | CO developed, mols. $10^3$ | $V^{++}$ in the solution, atoms. $10^3$ | $V(CO)_6^-$, mols. $10^{3a}$ |
|---|---|---|---|---|---|---|
| Type | cc. | | | | | |
| Methanol | 9.95 | 2.44 | 45 | 4.82 | 0.88 | 1.75 |
| Acetone | 9.95 | 2.36 | 20 | 4.82 | 0.79 | 1.78 |
| Tetrahydrofurane (b) | 7.85 | 1.64 | 7 | 3.64 | | |
| Pyridine | 6.55 | 2.47 | 15 | 4.81 | 0.75 | 1.72 | a Determined gravimetrically as Ni (o-phenanthroline)$_3 \cdot [V(CO)_6]_2$
b In this case the reaction leads to the formation of a yellow crystalline solid slightly soluble in tetrahydrofurane and in which the CO/V ratio is approximately 4.

In a similar way solutions containing the $[V(CO)_6]^-$ anion can be prepared, treating vanadium hexacarbonyl with diluted solutions of alkali and alkaline earth hydroxides.

We claim:
1. The compound vanadium hexacarbonyl, $V(CO)_6$.
2. A method of preparing vanadium hexacarbonyl, $V(CO)_6$, this method comprising reacting with carbon monoxide a vanadium compound selected from the group consisting of vanadium halides, vanadium acetylacetonates, vanadium alkoxides, vanadyl halides, and vanadyl acetylacetonates, in the presence of a reducing system comprising: (1) a component selected from the group consisting of the metals sodium, potassium, lithium, beryllium, magnesium, calcium, zinc, and aluminum, hydrides of said metals, alkyl hydrides of said metals, and mixtures thereof; (2) an amine selected from the group consisting of pyridine, quinoline, and tertiary amines; and (3) when said vanadium compound does not contain a halogen, a compound selected from the group consisting of elementary halogens, halides of metals of Groups IV–VIII of the Periodic Table, alkyl halides, cycloalkyl halides, and aryl halides; at a temperature of from about 50 to 250° C. and a pressure of at least 10 atmospheres, concentrating the resulting reaction products by evaporation, acidifying with a non-oxidizing acid to a pH not exceeding 4 to liberate vanadium hexacarbonyl, and separating said liberated vanadium hexacarbonyl.

3. The method of claim 2 wherein the vanadium compound is a vanadium halide.

4. The method of claim 2 wherein the vanadium compound is a vanadium acetyl acetonate.

5. The method of claim 2 wherein the vanadium compound is a vanadium alkoxide.

6. The method of claim 2 wherein the vanadium compound is a vanadyl halide.

7. The method of claim 2 wherein the vanadium compound is a vanadyl acetylacetonate.

8. The method of claim 2 wherein said freed vanadium hexacarbonyl is separated by extraction with a solvent followed by evaporation of said solvent.

9. The method of claim 2 wherein the vanadium compound is treated with a mixture of carbon monoxide and hydrogen.

10. The method of claim 2 wherein the vanadium compound is treated with a mixture of carbon monoxide and an inert gas.

11. The method of claim 2 carried out at a pressure of from about 10 to 400 atmospheres.

References Cited by the Examiner

UNITED STATES PATENTS

| | | | |
|---|---|---|---|
| 2,825,631 | 3/1958 | Lynch | 23—203 |
| 2,880,066 | 3/1959 | Closson et al. | 23—203 |
| 2,964,387 | 12/1960 | Podall et al. | 23—203 |
| 2,998,301 | 8/1961 | Wyman | 23—203 |
| 3,053,629 | 9/1962 | Pruett et al. | 23—203 |
| 3,067,011 | 12/1962 | Wyman | 23—203 |

FOREIGN PATENTS 877,109 9/1961 Great Britain.
578,731 7/1958 Italy.

OTHER REFERENCES

Blanchard: "Chemical Reviews," volume 21, pages 21–22 (1937).

(Other references on following page)

OTHER REFERENCES

Brimm et al.: J.A.C.S., vol. 76, pages 3831–3835 (July 20, 1954).

G. Natta et al.: Atti. Acad. Nazl. Lincei, Rend., Classe Sci. fis. mat. e nat. 27, pages 107–12 (1959), English abstract appears in Chemical Abstracts, vol. 54, columns 10252–3.

Marko: "Magyar Kemiai Folyoirat," vol. 61, 1955, pp. 339–341.

Pino et al.: "La Chimica e l'Industria," 37, 10:782–786, September 1955.

OSCAR R. VERTIZ, *Primary Examiner.*

MAURICE A. BRINDISI, *Examiner.*

M. N. MELLER, M. WEISSMAN, *Assistant Examiners.*